June 24, 1930.  J. DANKO  1,766,284
AIRPLANE
Filed Feb. 10, 1928    2 Sheets-Sheet 1
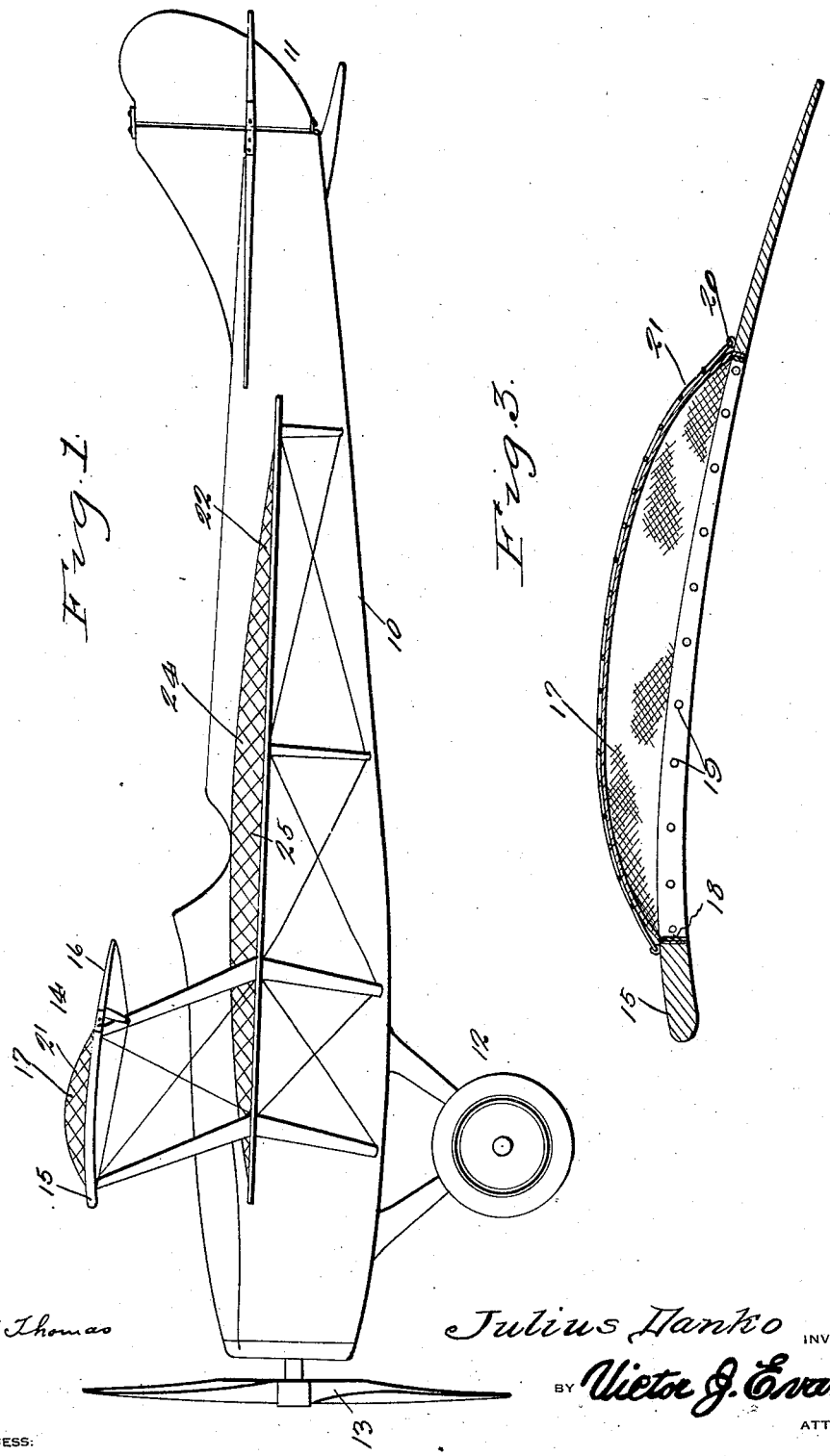
Julius Danko INVENTOR
BY Victor J. Evans ATTORNEY

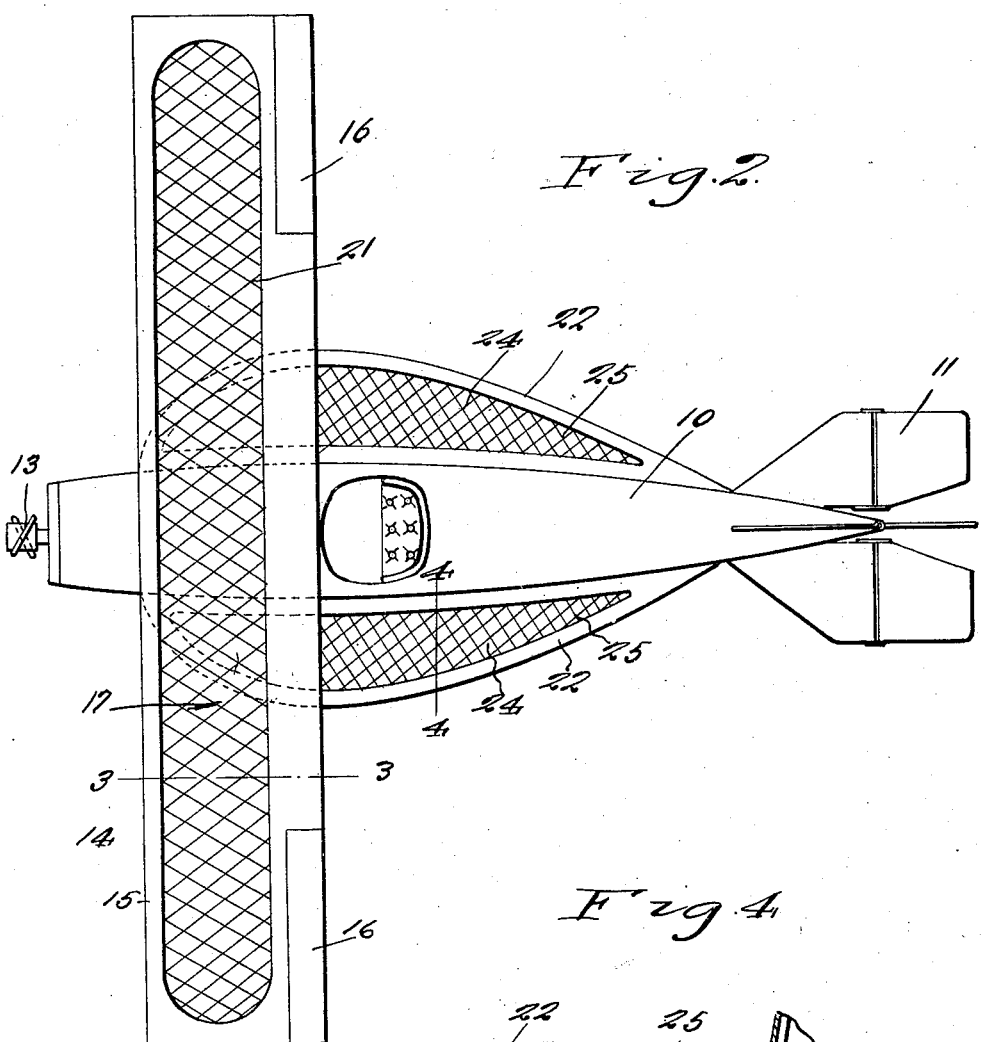

Patented June 24, 1930

1,766,284

UNITED STATES PATENT OFFICE

JULIUS DANKO, OF TOLEDO, OHIO

AIRPLANE

Application filed February 10, 1928. Serial No. 253,453.

This invention relates to improvements in airplanes, an object being to provide auxiliary wings arranged to increase the lifting power of an airplane especially at the "take off," and to offer increased resistance when descending so that the plane may descend with greater safety in the event of trouble.

Another object of the invention is the provision of a novel wing structure which, when the airplane is descending, will provide an air receiving pocket, functioning after the manner of a parachute to retard descent and add to the safety of a landing.

Another object of the invention is to provide a safety device of the general character illustrated and described for the accomplishment of the desired purpose in a positive and efficient manner, and one which will provide additional means of safety for airplanes and their occupants, offering little or no interference with the normal operation of the airplane.

Another object of the invention is the provision of means which projects laterally from the sides of the body of the airplane to increase its stability by resisting tendency of the plane to rock upon its longitudinal center.

With the above and other objects in view, the invention further includes the following novel features and details of construction, to be hereinafter more fully described, illustrated in the accompanying drawings and pointed out in the appended claim.

In the drawings:—

Figure 1 is a side elevation of an airplane constructed in accordance with the invention.

Figure 2 is a top plan view of the same.

Figure 3 is an enlarged sectional view taken substantially on the line 3—3 of Figure 2.

Figure 4 is a like view on the line 4—4 of Figure 2.

Referring to the drawings in detail wherein like characters of reference denote corresponding parts, the reference character 10 indicates the body or fuselage of the airplane which is provided with the usual tail rudders 11 and landing gear 12, while the propeller of the airplane is indicated at 13.

The foregoing is of the usual or any desired type. The airplane shown is of the monoplane type although a biplane may be used if desired.

One of the novel features of the invention resides in the wing structure. The wing which is indicated at 14 comprises a frame 15 of suitable construction and may be provided with ailerons 16.

Secured within the frame by any suitable means is a fabric or other closure member 17, the means employed for securing this member in place consisting of a metallic clamping strip 18 which is held in place by fastening devices 19. When the airplane is in action, the member 17 will be distended as shown in Figure 3 of the drawings so as to form an air receiving pocket. This will increase the lifting power of the wing and will materially aid at the "take off". It will also be of material assistance in retarding the descent of the airplane, especially in the event of a forced landing. In order to prevent injury to the member 17 through undue distension, the frame 15 has secured thereto as shown at 20, a net-like member 21 which covers the member 17 and acts to confine the member 17.

Extending laterally from opposite sides of the fuselage 10 are longitudinally disposed auxiliary wings 22. These wings include frames 23 within which are secured fabric or other members 24. These members like the members 17 are adapted to be distended to provide air receiving pockets and also assist at the "take off" and landing. In addition, these auxiliary wings 22 act as stabilizers in that they will resist tendency of the airplane to rock upon its longitudinal center. The flexible members 24 of the auxiliary wings are also provided with woven retaining covers 24 which are similar to the covers 21.

The fabric members 17 and 24 may be of any strong airproof material known in the art.

The invention is susceptible of various changes in its form, proportions and minor details of construction and the right is herein reserved to make such changes as properly fall within the scope of the appended claim.

Having described the invention what is claimed is:—

An airplane wing comprising a frame, a fabric web extending over the space defined by the members of the frame and capable of upward bulging, a metallic strip disposed against the marginal portions of the web and secured to the members of the frame, and a restraining sheet marginally secured to the frame members and extending in an upwardly bulged form over the said web and comprising diagonally intersecting strands.

In testimony whereof I affix my signature.

JULIUS DANKO.